(12) United States Patent
Turgeman et al.

(10) Patent No.: US 11,092,791 B2
(45) Date of Patent: Aug. 17, 2021

(54) METHOD AND DEVICE FOR SCANNING WELLS IN A MULTI-WELL PLATE

(71) Applicant: IDEA BIOMEDICAL LTD., Rehovot (IL)

(72) Inventors: Shlomo Turgeman, Rishon Letzion (IL); Yael Paran, Moshav Beit Oved (IL); Alex Efros, Rishon Letzion (IL)

(73) Assignee: IDEA BIO-MEDICAL LTD., Rehovot (IL)

( * ) Notice: Subject to any disclaimer, the term of this patent is extended or adjusted under 35 U.S.C. 154(b) by 76 days.

(21) Appl. No.: 16/423,063

(22) Filed: May 27, 2019

(65) Prior Publication Data

US 2020/0088980 A1    Mar. 19, 2020

Related U.S. Application Data

(63) Continuation of application No. 15/657,155, filed on Jul. 23, 2017, now Pat. No. 10,345,566, which is a
(Continued)

(30) Foreign Application Priority Data

Jan. 22, 2015    (GB) .................................... 1501093

(51) Int. Cl.
*G02B 21/00*    (2006.01)
*G02B 21/24*    (2006.01)
(Continued)

(52) U.S. Cl.
CPC ........... *G02B 21/006* (2013.01); *G02B 21/06* (2013.01); *G02B 21/241* (2013.01);
(Continued)

(58) Field of Classification Search
CPC ... G02B 7/28; G02B 7/30; G02B 7/36; G02B 7/38; G02B 21/00; G02B 21/006;
(Continued)

(56) References Cited

U.S. PATENT DOCUMENTS 6,970,789 B2    11/2005    Ippolito et al.
7,109,459 B2    9/2006    Kam et al.
(Continued)

FOREIGN PATENT DOCUMENTS

EP    1368689 A1    12/2003
EP    2759592    7/2014
(Continued)

OTHER PUBLICATIONS

GB 1501093.7 search report and examination report, dated Jul. 20, 2015.
(Continued)

*Primary Examiner* — Arnel C Lavarias
(74) *Attorney, Agent, or Firm* — Daniel Feigelson; Fourth Dimension IP

(57) ABSTRACT

An auto-focusing method for determining an in-focus position of a plurality of wells in at least a portion of a multi-well plate, the method including using a first objective lens having a first magnification to identify, in each of at least three wells of a selected subset of the plurality of wells, an in-focus position of each well with respect to the first objective lens, on the basis of at least three the in-focus positions, computing a plane along which the at least three wells will be in focus with respect to at least one objective lens having a second magnification that is not greater than the first magnification, and using the at least one objective lens to scan, along the plane, at least some of the plurality of wells in the portion of the plate.

20 Claims, 6 Drawing Sheets

Related U.S. Application Data continuation-in-part of application No. PCT/IB2016/050323, filed on Jan. 22, 2016.

(51) Int. Cl.
  *G02B 21/06* (2006.01)
  *G02B 21/33* (2006.01)
  *G02B 21/34* (2006.01)

(52) U.S. Cl.
  CPC ......... *G02B 21/244* (2013.01); *G02B 21/248* (2013.01); *G02B 21/33* (2013.01); *G02B 21/34* (2013.01)

(58) Field of Classification Search
  CPC ...... G02B 21/241; G02B 21/34; G03B 13/00; G03B 13/32; G03B 13/34; G03B 13/36; H04N 1/02409
  USPC ....... 359/362, 363, 368, 369, 396, 397, 398; 250/201.1, 201.2, 201.3, 201.4, 201.6, 250/201.7, 201.8; 435/283.1, 305.1, 435/305.2; 436/46, 164, 172, 807, 809; 206/557, 558, 561, 564; 73/863, 864.91
  See application file for complete search history.

(56) References Cited

U.S. PATENT DOCUMENTS

| | | | |
|---|---|---|---|
| 7,646,482 B2 | 1/2010 | Jiang | |
| 9,170,417 B2 | 10/2015 | MacPherson et al. | |
| 2003/0030869 A1 | 2/2003 | Kline et al. | |
| 2003/0030896 A1 | 2/2003 | Brooker | |
| 2005/0105174 A1 | 5/2005 | Ogihara | |
| 2005/0121596 A1 | 6/2005 | Kam et al. | |
| 2006/0000962 A1 | 1/2006 | Imabayashi | |
| 2006/0001954 A1 | 1/2006 | Wahl et al. | |
| 2007/0103687 A1* | 5/2007 | Okazaki | G01N 21/6452 356/417 |
| 2008/0297795 A1* | 12/2008 | Yonggang | G01N 21/253 356/326 |
| 2014/0210981 A1* | 7/2014 | Stauffer | G02B 21/241 348/79 |
| 2016/0041380 A1* | 2/2016 | Kuhn | G02B 7/36 348/79 |
| 2020/0341255 A1* | 10/2020 | Chan | G02B 21/245 |

FOREIGN PATENT DOCUMENTS

| | | |
|---|---|---|
| IL | 163881 | 11/2008 |
| JP | 2005114859 | 4/2005 |
| JP | 2006003653 A | 1/2006 |
| JP | 2009282357 A | 12/2009 |
| JP | 2010060509 | 3/2010 |
| JP | 2010-191298 | 9/2010 |
| KR | 2013-0013537 | 2/2013 |
| WO | 99/54711 | 10/1999 |
| WO | 02/063367 | 8/2002 |
| WO | 2012/097191 | 7/2012 |

OTHER PUBLICATIONS

International Search Report and Written Opinion for PCT/IB2016/050323, dated May 10, 2016.

* cited by examiner

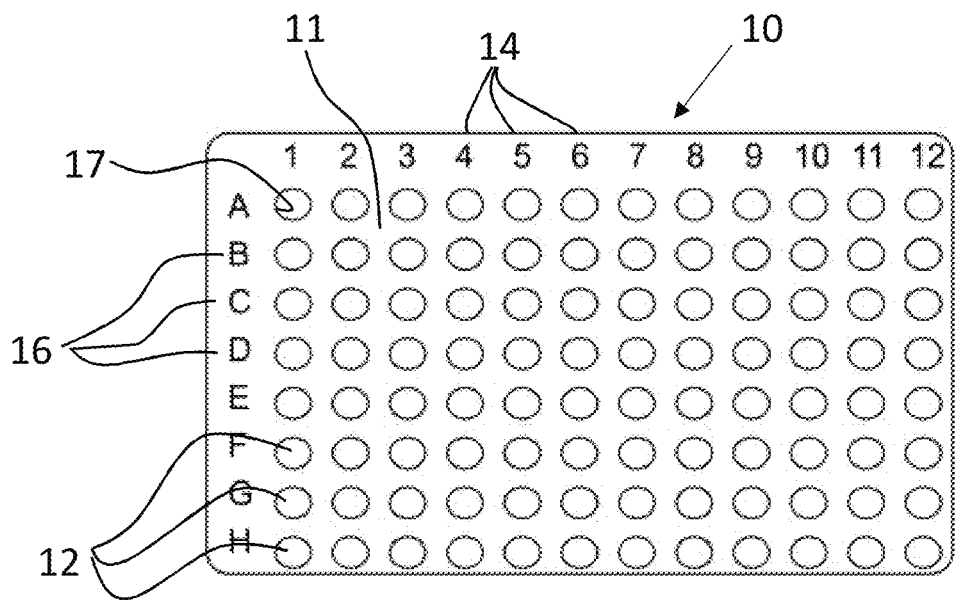
FIGURE 1A – PRIOR ART
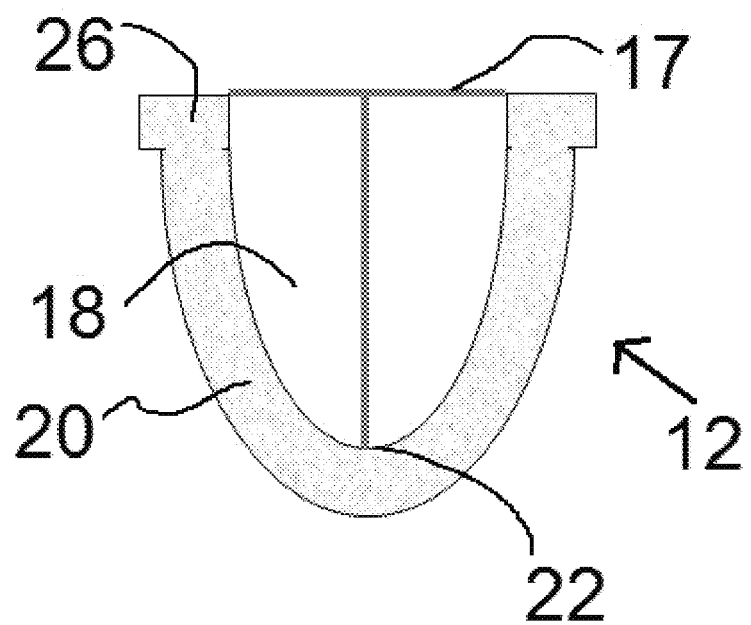
FIGURE 1B - PRIOR ART

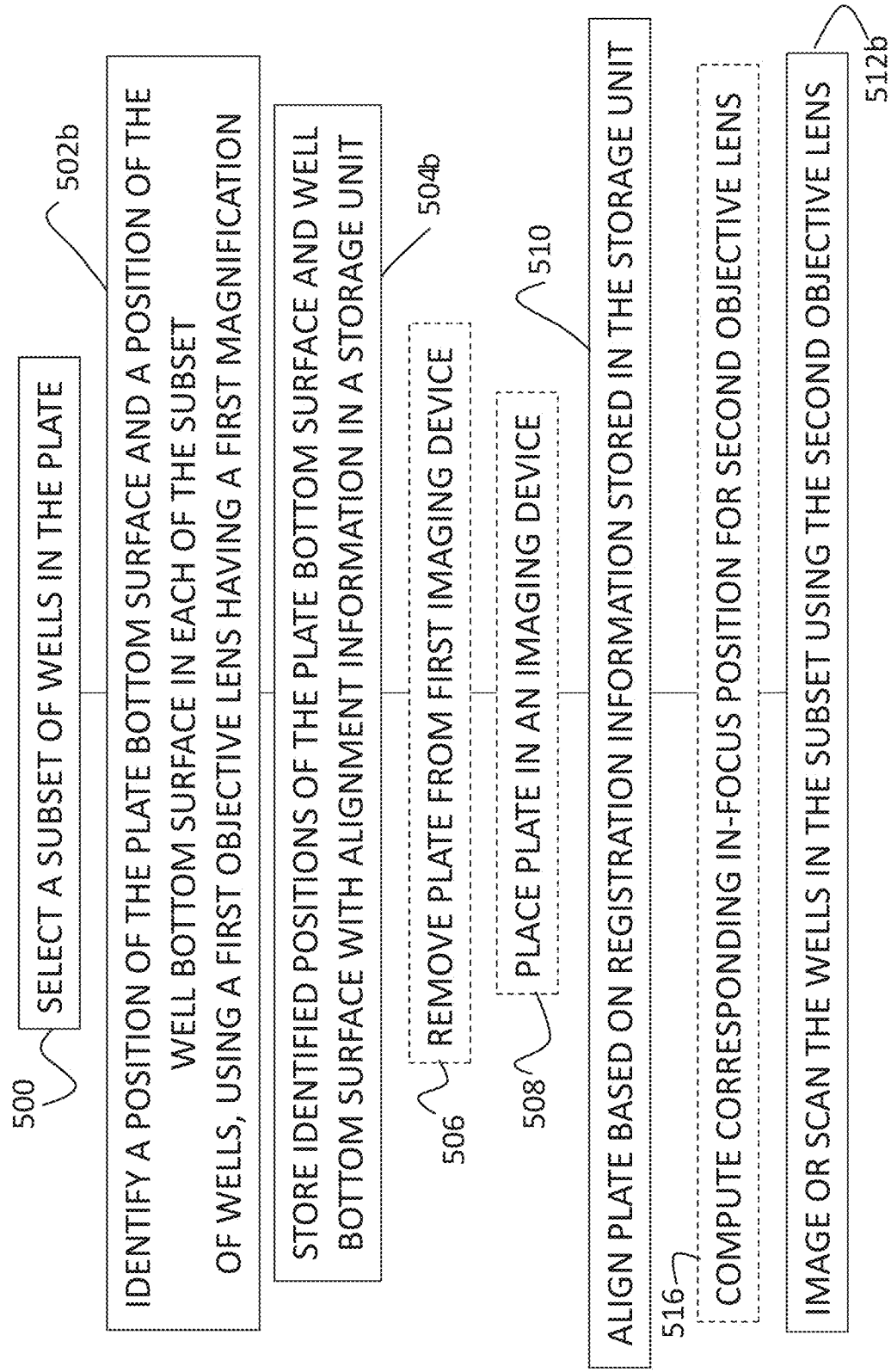

METHOD AND DEVICE FOR SCANNING WELLS IN A MULTI-WELL PLATE

CROSS-REFERENCE TO RELATED APPLICATIONS

This application is a continuation of U.S. Ser. No. 15/657,155, filed Jul. 23, 2017 and entitled "Auto-Focusing Method And Device", which is a continuation-in-part of PCT/IB2016/050323, filed Jan. 22, 2016 and entitled "Auto-Focusing Method And Device", which claims priority from GB 1501093.7, filed Jan. 22, 2015. The benefit and/or priority, as appropriate, of all of these applications is claimed, and the contents of all of said applications are incorporated herein by reference.

FIELD AND BACKGROUND

The present invention generally relates to the field of optical measurement and/or inspection techniques and more specifically relates to an auto-focus method and device, particularly useful when viewing non planar surfaces.

Auto focusing is an essential feature in many automated inspection fields such as the computer chip industry, biomedical research, data reading/recording in optical information carriers, etc. Specifically, when analyzing samples in multiwell plates including a plurality of wells on a single plate, auto focusing of a microscope viewing the contents of the wells can enable more efficient work procedures as the operator need not focus the objective on each well in the plate separately.

Various auto focusing methods for inspection of a multi-well plate have been disclosed in the past, such as in U.S. Pat. No. 7,109,459. However, when using wells having a non-planar bottom, such as a multiwell plate having wells with a U-shaped bottom, such as are used, for example, for growing living cells into spheroids, existing autofocus methods may require image analysis which is time-consuming.

In some cases, a multiwell plate is analyzed or is visualized using an oil immersion lens having a high numerical aperture. In such cases, focusing the objective using laser based autofocusing methods as described in U.S. Pat. No. 7,109,459 is difficult or impossible, as the similar refraction index of the lens and solution in the wells cancels one of the refraction points and a corresponding scanning peak, causing difficulty in focusing the objective lens.

Thus there are needs: (a) for auto focusing a microscope on a multiwell plate, which is suitable for multi-well plates having wells with a non-planar bottom surface; (b) to separate focusing process from scanning process to allow higher scanning and imaging speed; and (c) for a method for auto focusing a microscope using an oil immersion lens on a multiwell plate.

SUMMARY

The present invention generally relates to the field of optical measurement and/or inspection techniques and more specifically relates to an auto-focus method and device, particularly useful when viewing non planar surfaces.

There is provided in accordance with an embodiment of the invention an auto-focusing method for determining an in-focus position of a plurality of wells in at least a portion of a multi-well plate the method including:

using a first objective lens having a first magnification to identify, in each of at least three wells of a selected subset of the plurality of wells an in-focus position of each said well with respect to the first objective lens;

on the basis of at least three said in-focus positions, computing a plane along which the at least three wells will be in focus with respect to at least one objective lens having a second magnification that is not greater than the first magnification; and using the at least one objective lens to scan, along the plane, at least some of the plurality of wells in the portion of the plate.

In some embodiments, the at least one objective lens is the first objective lens, and the first magnification is equal to the second magnification. In some embodiments, the computing a plane includes computing a plane along which the at least three wells are in focus with respect to the first objective lens.

In some embodiments, the at least one objective lens is a second objective lens, different from the first objective lens, wherein the second magnification is smaller than the first magnification. In some embodiments, computing a plane includes translating at least three of the in-focus positions identified using the first objective lens to corresponding second in-focus positions with respect to the second objective lens based on optical characteristics of the second objective lens; and computing the plane on the basis of at least three the second in-focus positions. In some embodiments, computing a plane includes: on the basis of at least three said in-focus positions, computing a first plane along which the at least three wells will be in focus with respect to the first objective lens; and translating the first plane to a corresponding plane along which the at least three wells will be in focus with respect to the second objective lens based on optical characteristics of the second objective lens, thereby to compute the plane.

In some embodiments, scanning using the at least one objective lens is carried out without carrying out additional focusing operations.

In some embodiments, the subset of the plurality of wells includes more than three of the plurality of wells.

In some embodiments, identifying an in-focus position includes identifying an in-focus position for each well in the subset.

In some embodiments, each of the wells includes (a) a generally cylindrical side wall, and (b) a bottom surface which includes a portion of at least one of a sphere, a paraboloid, and an ellipsoid. In some embodiments, each of the wells has a U-shaped cross-section.

In some embodiments, each of the wells includes a generally cylindrical side wall and a planar bottom surface. In some embodiments, the planar bottom surface lies generally parallel to a top surface of the multiwell plate, such that the well has a rectangular cross section.

In some embodiments, each of the wells is frusto-conical.

In some embodiments, each of the wells has an inclined side wall, a planar bottom, and a trapezoidal cross section.

In some embodiments, the method further includes, prior to the using a first objective lens, aligning the first objective lens to lie axially over the center of one of the wells.

In some embodiments, the portion of the plate includes a quadrant of the plate. In some embodiments, the portion of the plate includes an entirety of the plate.

In some embodiments, using a first objective lens is carried out in a first scanning device and using the at least one objective lens is carried out in a second scanning device, and the method further comprises, following the computing the plane and prior to the using the at least one objective lens:

storing alignment data of the plate along the X and Y axes in the first scanning device, and data relating to the plane, in a computer storage element which is in communication with the first and the second scanning devices;

moving the multi-well plate to the second scanning device; and aligning the multi-well plate along the X and Y axes in the second scanning device based on the alignment data stored in the computer storage element.

There is also provided, in accordance with an embodiment of the invention, an auto-focusing method for determining an in-focus position of at least a portion of a well in a plate, the method including: using a first objective lens having a first magnification to identify, at at least one location of the well, a first in-focus position of at least a portion of the well with respect to the first objective lens; identifying, for the first in-focus position, a corresponding in-focus position with respect to at least one objective lens having a second magnification, based on optical characteristics of the at least one objective lens; and using the at least one objective lens to scan, at a height corresponding to the corresponding in-focus position, at least the portion of the well, wherein the second magnification is not greater than the first magnification.

In some embodiments, the at least one objective lens is the first objective lens, the first magnification is equal to the second magnification, and the corresponding in-focus position is the first in-focus position.

In some embodiments, the at least one objective lens includes a second objective lens, different from the first objective lens, wherein the second magnification is smaller than the first magnification. In some such embodiments, the identifying includes translating the first in-focus position to the corresponding in-focus position with respect to the second objective lens based on optical characteristics of the second objective lens.

In some embodiments, scanning using the at least one objective is carried out without carrying out additional focusing operations.

In some embodiments, the well includes a generally cylindrical side wall and a bottom surface which includes a portion of at least one of a sphere, a paraboloid, and an ellipsoid. In some embodiments, the well has a U-shaped cross-section.

In some embodiments, the well includes a generally cylindrical side wall and a planar bottom surface. In some embodiments, the planar bottom surface lies generally parallel to a top surface of the plate, such that the well has a rectangular cross section.

In some embodiments, the well is frusto-conical. In some embodiments, the well has an inclined side wall, a planar bottom, and a trapezoidal cross section.

In some embodiments, using a first objective lens is carried out in a first scanning device and using the at least one objective lens is carried out in a second scanning device, and the method further comprises, following identifying the corresponding in-focus position and prior to the using the at least one objective lens:

storing alignment data relating to alignment of the plate along the X and Y axes in the first scanning device, and data relating to the corresponding in focus position, in a computer storage element which is in communication with the first and the second scanning devices;

moving the plate to the second scanning device; and aligning the well in the plate in the second scanning device based on the registration data stored in the computer storage element.

There is also provided, in accordance with an embodiment of the invention, an auto-focusing device for automatically determining an in-focus position of a plurality of wells located in at least a portion of a plate containing wells, the device including: a computation component programmed to compute a plane along which at least three wells in the portion of the plate would be in focus with respect to an objective lens; a first objective lens functionally associated with the computation component, the first objective lens having a first magnification, signals obtained with the first objective lens being used by the computation component for identifying an in-focus position for each of at least three wells of a selected subset of the plurality of wells; and at least one objective lens having a second magnification, the second magnification being not greater than the first magnification, for scanning at least some of the plurality of wells in the portion of the plate along the plane, wherein the computation component is configured to compute the plane along which the at least three wells would be in-focus with respect to the at least one objective lens on the basis of at least three the in-focus positions.

In some embodiments, the at least one objective lens is configured to scan the plurality of wells along the plane without carrying out additional focusing operations.

In some embodiments, the at least one objective lens is the first objective lens, and the second magnification is equal to the first magnification.

In some embodiments, the at least one objective lens is a second objective lens, different from the first objective lens, and the second magnification is smaller than the first magnification.

In some embodiments, the computation component is programmed to compute the in-focus plane by: translating at least three of the in-focus positions identified using the first objective lens to corresponding second in-focus positions with respect to the second objective lens based on optical characteristics of the second objective lens; and computing the in-focus plane on the basis of at least three the second in-focus positions.

In some embodiments, the computation component is programmed to compute the in-focus plane by: on the basis of at least three the in-focus positions, computing a first plane along which the at least three wells will be in focus with respect to the first objective lens; and translating the first plane to a corresponding plane along which the at least three wells will be in focus with respect to the second objective lens based on optical characteristics of the second objective lens, thereby to compute the plane.

In some embodiments, the computation component is programmed to identify an in-focus position for each well in the subset.

In some embodiments, the device is configured for use with a plate in which each of the wells includes (a) a generally cylindrical side wall, and (b) a bottom surface which includes at least one of a portion of a sphere, a paraboloid, and an ellipsoid. In some embodiments, the device is configured for use with a plate in which each of the wells has a U-shaped cross section.

In some embodiments, the device is configured for use with a plate in which each of the wells includes a generally cylindrical side wall and a planar bottom surface. In some embodiments, the planar bottom surface lies generally parallel to a top surface of the plate, such that each of the wells has a generally rectangular cross section.

In some embodiments, the device is configured for use with a plate in which each of the wells is frusto-conical. In some embodiments, the device is configured for use with a plate in which each of the wells has an inclined side wall, a planar bottom, and a trapezoidal cross section.

In some embodiments, the portion of the plate includes a quadrant of the plate. In some embodiments, the portion of the plate includes an entirety of the plate.

There is also provided, in accordance with an embodiment of the invention, an auto-focusing device for automatically determining an in-focus position of at least a portion of a well, the device including: a computation component programmed to identify an in-focus position of the portion of the well; a first objective lens functionally associated with the computation component, the first objective lens having a first magnification, signals obtained with the first objective lens being used by the computation component for identifying, in at least one position of the well, a first in-focus position of the well with respect to the first objective lens; and at least one objective lens having a second magnification, the second magnification not being greater than the first magnification, for scanning at least a portion of the well at a height of a corresponding in-focus position of the well with respect to the at least one objective lens, wherein the computation component is programmed to identify the corresponding in-focus position based on optical characteristics of the at least one objective lens.

In some embodiments, the at least one objective lens is configured to scan the portion of the well without carrying out additional focusing operations.

In some embodiments, the at least one objective lens is the first objective lens, the second magnification is equal to the first magnification, and the corresponding in-focus position is the same as the first in-focus position.

In some embodiments, the at least one objective lens is a second objective lens different from the first objective lens, and wherein the second magnification is smaller than the first magnification.

In some embodiments, the computation component is programmed to identify the corresponding in-focus position by translating the first in-focus position to the corresponding in-focus position with respect to the second objective lens based on optical characteristics of the second objective lens.

In some embodiments, the device is configured for use with a well including a generally cylindrical side wall and a bottom surface which includes at least one of a portion of a sphere, a paraboloid, and an ellipsoid. In some embodiments, the device is configured for use with a well having a U-shaped cross section.

In some embodiments, the device is configured for use with a well including a generally cylindrical side wall and a planar bottom surface. In some embodiments, the planar bottom surface lies generally parallel to a top surface of the plate, such that the well has a generally rectangular cross section.

In some embodiments, the device is configured for use with a frusto-conical well. In some embodiments, the device is configured for use with a well having an inclined side wall, a planar bottom, and a trapezoidal cross section.

There is also provided, in accordance with an embodiment of the invention, an auto-focusing system for automatically determining an in-focus position of a plurality of wells located in at least a portion of a plate containing wells, the system including:

a computation component programmed to compute a plane along which at least three wells in the portion of the plate would be in focus with respect to an objective lens;

a first scanning device including a first objective lens and being functionally associated with the computation component, the first objective lens having a first magnification, signals obtained with the first objective lens being used by the computation component for identifying an in-focus position for each of at least three wells of a selected subset of the plurality of wells;

a storage component functionally associated with the computation component and with the first scanning device, configured to store alignment data relating to alignment of the plate along X and Y axes in the first scanning device during obtaining of the signals and data relating to the computed plane; and a second scanning device functionally associated with the storage component and including at least one objective lens having a second magnification, the second magnification being not greater than the first magnification, for scanning at least some of the plurality of wells in the portion of the plate along the plane, wherein the second scanning device is configured to align the plate along X and Y axes according to the alignment data stored in the storage component, and wherein the computation component is configured to compute the plane along which the at least three wells would be in-focus with respect to the at least one objective lens on the basis of at least three the in-focus positions.

There is also provided, in accordance with an embodiment of the invention, an auto-focusing device for automatically determining an in-focus position of at least a portion of a well, the device including:

a computation component programmed to identify an in-focus position of the portion of the well;

a first scanning device including a first objective lens and being functionally associated with the computation component, the first objective lens having a first magnification, signals obtained with the first objective lens being used by the computation component for identifying, in at least one position of the well, a first in-focus position of the well with respect to the first objective lens;

a storage component functionally associated with the computation component and with the first scanning device, configured to store alignment data relating to alignment of the plate along X and Y axes in the first scanning device during obtaining of the signals and data relating to the identified in-focus position of the portion of the well; and a second scanning device functionally associated with the storage component and including a second objective lens, the second objective lens being different from the first objective lens and having a second magnification, the second magnification being smaller than the first magnification, for scanning at least a portion of the well at a height of a corresponding in-focus position of the well with respect to the at least one objective lens, wherein the second scanning device is configured to align the plate along X and Y axes according to the alignment data stored in the storage component, and wherein the computation component is programmed to identify the corresponding in-focus position based on optical characteristics of the at least one objective lens.

There is also provided, in accordance with an embodiment of the invention, an auto-focusing method for determining an in-focus position of a plurality of wells in at least a portion of a multi-well plate, the multi-well plate having a plate bottom surface and each well in the plurality of wells having a well bottom surface, the method including:

using a first objective lens having a first magnification to identify, for each well in a selected subset of the plurality of wells, a position of the plate bottom surface with respect to the well;

using at least one objective lens having a second magnification that is not greater than the first magnification, and beginning from the position of the plate bottom surface with respect to each well in the selected subset, identifying an in-focus position of the well bottom surface for each well with respect to the at least one objective lens; and using the at least one objective lens to scan, at the in focus position, each of the wells in the selected subset.

In some embodiments, using a first objective lens is carried out in a first scanning device and using the at least one objective lens is carried out in a second scanning device, and the method further includes, following using the first objective lens and prior to the using the at least one objective lens:

storing alignment data relating to alignment of the plate along X and Y axes in the first scanning device, and data relating to the identified position of the plate bottom surface with respect to each well in the selected subset, in a computer storage element which is in communication with the first and the second scanning devices;

moving the multi-well plate to the second scanning device; and aligning the multi-well plate along X and Y axes in the second scanning device based on the alignment data stored in the computer storage element.

In some embodiments, the aligning further includes aligning the at least one objective lens of the second scanning device at a height along the Z axis of the second scanning device which is in focus with respect to the identified position of the plate bottom surface.

There is also provided, in accordance with an embodiment of the invention, an auto-focusing method for determining an in-focus position of a plurality of wells in at least a portion of a multi-well plate, the multi-well plate having a plate bottom surface and each well in the plurality of wells having a well bottom surface, the method including:

using a first objective lens having a first magnification to identify, for each well in a selected subset of the plurality of wells, a first position of the plate bottom surface and a second position of a well bottom surface with respect to the well;

based on the identified second position, identifying, for each well in the selected subset, an in-focus position of the well relative to at least one objective lens having a second magnification that is not greater than the first magnification; and using the at least one objective lens to scan, at the in focus position of the well, each of the wells in the selected subset.

In some embodiments, using a first objective lens is carried out in a first scanning device and using the at least one objective lens is carried out in a second scanning device, and the method further includes, following using the first objective lens and prior to the using the at least one objective lens:

storing alignment data relating to alignment of the plate along X and Y axes in the first scanning device, and data relating to the identified position of the well bottom surface, in a computer storage element which is in communication with the first and the second scanning devices;

moving the multi-well plate to the second scanning device; and aligning the multi-well plate along X and Y axes in the second scanning device based on the alignment data stored in the computer storage element.

In some embodiments, the aligning further includes aligning the at least one objective lens of the second scanning device at a height along the Z axis of the second scanning device which is in focus with respect to the identified position of the well bottom surface.

In some embodiments, the first scanning device and the second scanning device are the same scanning device, the method further including, following storing the alignment data, removing the multi-well plate from the scanning device, and moving the multi-well plate to the second scanning device includes returning the multi-well plate to the scanning device.

In some embodiments, the first scanning device and the second scanning device are the same scanning device, the method further including, following storing the alignment data, changing an objective lens of the scanning device from the first objective lens to the at least one objective lens.

In some embodiments, the first objective lens includes an air objective lens, the at least one objective lens is a second objective lens which is an oil immersion objective lens or a water immersion objective lens, and the identifying includes computing a difference between the second position and the in-focus position due to the first objective lens and the second objective lens being of different types.

In some embodiments, the at least one objective lens is a second objective lens, different from the first objective lens, and the second magnification is smaller than the first magnification, and the identifying includes computing a difference between the second position and the in-focus position due to a magnification difference between the first and second magnifications.

In some embodiments, the at least one objective lens is the first objective lens.

In some embodiments, the first magnification is equal to the second magnification.

In some embodiments, the at least one objective lens is a second objective lens, different from the first objective lens, wherein the second magnification is smaller than the first magnification.

In some embodiments, the subset of the plurality of wells includes more than three of the plurality of wells.

In some embodiments, each of the wells includes a generally cylindrical side wall, and a bottom surface including a portion of at least one of a sphere, a paraboloid, and an ellipsoid. In some embodiments, each of the wells has a U-shaped cross-section.

In some embodiments, each of the wells includes a generally cylindrical side wall, and a planar bottom surface. In some embodiments, the planar bottom surface lies generally parallel to a top surface of the multiwell plate, such that the well has a rectangular cross section.

In some embodiments, each of the wells is frusto-conical. In some embodiments, each of the wells has an inclined side wall, a planar bottom, and a trapezoidal cross section.

In some embodiments, the method further includes, prior to using a first objective lens, aligning the first objective lens to lie axially over the center of one of the wells.

In some embodiments, the portion of the plate includes a quadrant of the plate. In some embodiments, the portion of the plate includes an entirety of the plate.

There is also provided, in accordance with an embodiment of the invention, an auto-focusing method for determining an in-focus position of a plurality of fields in at least a portion of a well in a plate, the plate having a plate bottom surface and the well having a well bottom surface, the method including:

using a first objective lens having a first magnification to identify, at each field in a selected subset of the plurality of fields, a position of the plate bottom surface with respect to the field;

using a second objective lens having a second magnification that is smaller than the first magnification, and beginning from the position of the plate bottom surface with respect to each the field in the selected subset, identifying an in-focus position of the well bottom surface of each the field in the selected subset with respect to the second objective lens; and using the second objective lens to scan, at the in-focus position of the well bottom surface, each the field in the selected subset.

In some embodiments, using a first objective lens is carried out in a first scanning device and using the at least one objective lens is carried out in a second scanning device, and the method further includes, following the using the first objective lens and prior to the using the at least one objective lens:

storing alignment data relating to alignment of the plate along X and Y axes in the first scanning device, and data relating to the identified position of the plate bottom surface with respect to each the field in the selected subset, in a computer storage element which is in communication with the first and the second scanning devices;

moving the multi-well plate to the second scanning device; and aligning the multi-well plate along X and Y axes in the second scanning device based on the alignment data stored in the computer storage element.

In some embodiments, the aligning further includes aligning the at least one objective lens of the second scanning device at a height along the Z axis of the second scanning device which is in focus with respect to the identified position of the plate bottom surface.

There is also provided, in accordance with an embodiment of the invention, an auto-focusing method for determining an in-focus position of a plurality of fields in at least a portion of a well in a plate, the plate having a plate bottom surface and the well having a well bottom surface, the method including:

using a first objective lens having a first magnification to identify, at each field in a selected subset of the plurality of fields, a first position of the plate bottom surface and a second position of the well bottom surface with respect to the field;

based on the identified second position, identifying, for each the field in the selected subset, an in-focus position of the field relative to at least one objective lens having a second magnification that is not greater than the first magnification; and using the at least one objective lens to scan, at the in-focus position of the field, each the field in the selected subset.

In some embodiments, using a first objective lens is carried out in a first scanning device and using the at least one objective lens is carried out in a second scanning device, and the method further includes, following using the first objective lens and prior to the using the at least one objective lens:

storing alignment data relating to alignment of the plate along X and Y axes in the first scanning device, and data relating to the identified position of the well bottom surface with respect to each the field in the selected subset, in a computer storage element which is in communication with the first and the second scanning devices;

moving the multi-well plate to the second scanning device; and aligning the multi-well plate along X and Y axes in the second scanning device based on the alignment data stored in the computer storage element.

In some embodiments, the aligning further includes aligning the at least one objective lens of the second scanning device at a height along the Z axis of the second scanning device which is in focus with respect to the identified position of the well bottom surface.

In some embodiments, the first scanning device and the second scanning device are the same scanning device, the method further includes, following storing the alignment data, removing the multi-well plate from the scanning device, and moving the multi-well plate to the second scanning device includes returning the multi-well plate to the scanning device.

In some embodiments, the first scanning device and the second scanning device are the same scanning device, the method further includes, following storing the alignment data, changing an objective lens of the scanning device from the first objective lens to the at least one objective lens.

In some embodiments, the first objective lens includes an air objective lens, the at least one objective lens is a second objective lens which is an oil immersion objective lens or a water immersion objective lens, and the identifying includes computing a difference in between the second position and the in-focus position due to the first objective lens and the second objective lens being of different types.

In some embodiments, the at least one objective lens is a second objective lens, different from the first objective lens, and the second magnification is smaller than the first magnification, and the identifying includes computing a difference between the second position and the in-focus position due to a magnification difference between the first and second magnifications.

In some embodiments, the well includes a generally cylindrical side wall, and a bottom surface including a portion of at least one of a sphere, a paraboloid, and an ellipsoid. In some embodiments, the well has a U-shaped cross-section.

In some embodiments, the well includes a generally cylindrical side wall, and a planar bottom surface. In some embodiments, the planar bottom surface lies generally parallel to a top surface of the plate, such that the well has a rectangular cross section.

In some embodiments, the well is frusto-conical. In some embodiments, the well has an inclined side wall, a planar bottom, and a trapezoidal cross section.

There is also provided, in accordance with an embodiment of the invention, an auto-focusing device for automatically determining an in-focus position of a plurality of wells located in at least a portion of a plate containing wells, the plate having a plate bottom surface and each of the plurality of wells having a well bottom surface, the device including:

a computation component programmed to identify a position of the plate bottom surface with respect to each well in a selected subset of the plurality of wells and a position of the well bottom surface with respect to each well in the selected subset;

a first objective lens functionally associated with the computation component, the first objective lens having a first magnification, signals obtained with the first objective lens being used by the computation component for identifying the position of the plate bottom surface with respect to each well in the subset; and at least one objective lens having a second magnification, the second magnification being not greater than the first magnification, signals obtained with the at least one objective lens being used by the computation component for identifying the position of the well bottom surface with respect to each well in the subset, the at least one objective lens configured for scanning each well in the subset at the position of the well bottom surface.

There is also provided, in accordance with an embodiment of the invention, an auto-focusing device for automatically determining an in-focus position of a plurality of wells located in at least a portion of a plate containing wells, the plate having a plate bottom surface and each of the plurality of wells having a well bottom surface, the device including:

a computation component programmed to identify a position of the plate bottom surface with respect to each well in a selected subset of the plurality of wells and a position of the well bottom surface with respect to each well in the selected subset;

a first objective lens functionally associated with the computation component, the first objective lens having a first magnification, signals obtained with the first objective lens being used by the computation component for identifying the positions of the plate bottom surface and of the well bottom surface with respect to each well in the subset; and at least one objective lens having a second magnification, the second magnification being not greater than the first magnification, the at least one objective lens configured for scanning each well in the subset at the position of the well bottom surface.

In some embodiments, the at least one objective lens is the first objective lens and the second magnification is equal to the first magnification.

In some embodiments, the at least one objective lens is a second objective lens, different from the first objective lens, and the second magnification is smaller than the first magnification.

In some embodiments, the second objective lens is an oil immersion objective lens, and the computation component is programmed to compute, based on at least one of the positions of the plate bottom surface and the well bottom surface identified with respect to the first objective lens, at least one of a corresponding position of the plate bottom surface and the well bottom surface with respect to the oil immersion objective lens.

In some embodiments, the second objective lens is an water immersion objective lens, and the computation component is programmed to compute, based on at least one of the positions of the plate bottom surface and the well bottom surface identified with respect to the first objective lens, at least one of a corresponding position of the plate bottom surface and the well bottom surface with respect to the water immersion objective lens.

In some embodiments, the device is configured for use with a plate in which each of the wells includes a generally cylindrical side wall, and a bottom surface including at least one of a portion of a sphere, a paraboloid, and an ellipsoid. In some embodiments, the device is configured for use with a plate in which each of the wells has a U-shaped cross section.

In some embodiments, the device is configured for use with a plate in which each of the wells includes a generally cylindrical side wall, and a planar bottom surface. In some embodiments, the planar bottom surface lies generally parallel to a top surface of the plate, such that each of the wells has a generally rectangular cross section.

In some embodiments, the device is configured for use with a plate in which each of the wells is frusto-conical. In some embodiments, the device is configured for use with a plate in which each of the wells has an inclined side wall, a planar bottom, and a trapezoidal cross section.

In some embodiments, the portion of the plate includes a quadrant of the plate.

In some embodiments, the portion of the plate includes an entirety of the plate.

There is also provided, in accordance with an embodiment of the invention, an auto-focusing device for automatically determining an in-focus position of a plurality of fields in at least a portion of a well in a plate, the plate having a plate bottom surface and the well having a well bottom surface, the device including:

a computation component programmed to identify, for each field in a selected subset of the plurality of fields, a first position of the plate bottom surface and a second position of the well bottom surface with respect to the field;

a first objective lens functionally associated with the computation component, the first objective lens having a first magnification, signals obtained with the first objective lens being used by the computation component for identifying, in at least one field of selected subset of fields, a position of the plate bottom surface; and at least one objective lens having a second magnification, the second magnification being not greater than the first magnification, signals obtained with the at least one objective lens being used by the computation component for identifying the position of the well bottom surface with respect to each the field in the subset, the at least one objective lens configured for scanning each the field in the subset at the position of the well bottom surface with respect to the field.

There is also provided, in accordance with an embodiment of the invention, an auto-focusing device for automatically determining an in-focus position of a plurality of fields in at least a portion of a well in a plate, the plate having a plate bottom surface and the well having a well bottom surface, the device including:

a computation component programmed to identify, for each field in a selected subset of the plurality of fields, a first position of the plate bottom surface and a second position of the well bottom surface with respect to the field;

a first objective lens functionally associated with the computation component, the first objective lens having a first magnification, signals obtained with the first objective lens being used by the computation component for identifying the positions of the plate bottom surface and of the well bottom surface with respect to each the field in the subset; and at least one objective lens having a second magnification, the second magnification being not greater than the first magnification, the at least one objective lens configured for scanning each the field in the subset at the position of the well bottom surface.

In some embodiments, the at least one objective lens is the first objective lens and the second magnification is equal to the first magnification.

In some embodiments, the at least one objective lens is a second objective lens, different from the first objective lens, and the second magnification is smaller than the first magnification.

In some embodiments, the second objective lens is an oil immersion objective lens, and the computation component is programmed to compute, based on at least one of the positions of the plate bottom surface and the well bottom surface identified with respect to the first objective lens, at least one of a corresponding position of the plate bottom surface and the well bottom surface with respect to the oil immersion objective lens.

In some embodiments, the second objective lens is a water immersion objective lens, and the computation component is programmed to compute, based on at least one of the positions of the plate bottom surface and the well bottom surface identified with respect to the first objective lens, at least one of a corresponding position of the plate bottom surface and the well bottom surface with respect to the water immersion objective lens.

In some embodiments, the device is configured for use with a well including a generally cylindrical side wall, and a bottom surface including at least one of a portion of a sphere, a paraboloid, and an ellipsoid. In some embodiments, the device is configured for use with a well having a U-shaped cross section.

In some embodiments, the device is configured for use with a well including a generally cylindrical side wall, and a planar bottom surface. In some embodiments, the planar bottom surface lies generally parallel to a top surface of the plate, such that the well has a generally rectangular cross section.

In some embodiments, the device is configured for use with a frusto-conical well. In some embodiments, the device is configured for use with a well having an inclined side wall, a planar bottom, and a trapezoidal cross section.

There is also provided, in accordance with an embodiment of the invention, an auto-focusing system for automatically determining an in-focus position of a plurality of wells located in at least a portion of a plate containing wells, the plate having a plate bottom surface and each of the plurality of wells having a well bottom surface, the system including:

a computation component programmed to identify a position of the plate bottom surface with respect to each well in a selected subset of the plurality of wells and a position of the well bottom surface with respect to each well in the selected subset;

a first scanning device functionally associated with the computation component, and including a first objective lens having a first magnification, signals obtained with the first objective lens being used by the computation component for identifying the position of the plate bottom surface with respect to each well in the subset;

a storage component functionally associated with the computation component and with the first scanning device, configured to store alignment data relating to alignment of the plate along X and Y axes in the first scanning device during obtaining if the signals and data relating to the identified position of the plate bottom surface for each well in the subset; and a second scanning device functionally associated with the storage component and including at least one objective lens having a second magnification, the second magnification being not greater than the first magnification, signals obtained with the at least one objective lens being used by the computation component for identifying the position of the well bottom surface with respect to each well in the subset, the at least one objective lens configured for scanning each well in the subset at the position of the well bottom surface, wherein the second scanning device is configured to align the plate along X and Y axes in the second scanning device based on the alignment data stored in the storage component.

In some embodiments, the second scanning device is further configured to align the at least one objective lens at a height along the Z axis of the second scanning device which is in focus with respect to the identified position of the plate bottom surface.

There is also provided, in accordance with an embodiment of the invention, an auto-focusing system for automatically determining an in-focus position of a plurality of wells located in at least a portion of a plate containing wells, the plate having a plate bottom surface and each of the plurality of wells having a well bottom surface, the system including:

a computation component programmed to identify a position of the plate bottom surface with respect to each well in a selected subset of the plurality of wells and a position of the well bottom surface with respect to each well in the selected subset;

a first scanning device functionally associated with the computation component, and including a first objective lens having a first magnification, signals obtained with the first objective lens being used by the computation component for identifying the positions of the plate bottom surface and of the well bottom surface with respect to each well in the subset;

a storage component functionally associated with the computation component and with the first scanning device, configured to store alignment data relating to alignment of the plate along X and Y axes in the first scanning device during obtaining of the signals and data relating to the identified position of the plate bottom surface and of the well bottom surface for each well in the subset; and a second scanning device functionally associated with the storage component and including at least one objective lens having a second magnification, the second magnification being not greater than the first magnification, the at least one objective lens configured for scanning each well in the subset at the position of the well bottom surface, wherein the second scanning device is configured to align the plate along X and Y axes in the second scanning device based on the alignment data stored in the storage component.

In some embodiments, the second scanning device is further configured to align the at least one objective lens at a height along the Z axis of the second scanning device which is in focus with respect to the identified position of the well bottom surface.

In some embodiments, the first scanning device and the second scanning device are the same scanning device, and the scanning device is configured to align the plate along the X and Y axes following removal of the plate from the scanning device and reinsertion of the plate into the scanning device.

There is also provided, in accordance with an embodiment of the invention, an auto-focusing system for automatically determining an in-focus position of a plurality of fields in at least a portion of a well in a plate, the plate having a plate bottom surface and each of the plurality of wells having a well bottom surface, the system including:

a computation component programmed to identify, for each field in a selected subset of the plurality of fields, a first position of the plate bottom surface with respect to the field and a second position of the well bottom surface with respect to the field;

a first scanning device functionally associated with the computation component, and including a first objective lens having a first magnification, signals obtained with the first objective lens being used by the computation component for identifying the position of the plate bottom surface with respect to each the field in the subset;

a storage component functionally associated with the computation component and with the first scanning device, configured to store alignment data relating to alignment of the plate along X and Y axes in the first scanning device during obtaining of the signals and data relating to the identified position of the plate bottom surface for each field in the subset; and a second scanning device functionally associated with the storage component and including at least one objective lens having a second magnification, the second magnification being not greater than the first magnification, signals obtained with the at least one objective lens being used by the computation component for identifying the position of the well bottom surface with respect to each the field in the subset, the at least one objective lens configured for scanning each the field in the subset at the position of the well bottom surface, wherein the second scanning device is configured to align the plate along X and Y axes in the second scanning device based on the alignment data stored in the storage component.

In some embodiments, the second scanning device is further configured to align the at least one objective lens at a height along the Z axis of the second scanning device which is in focus with respect to the identified position of the plate bottom surface.

There is also provided, in accordance with an embodiment of the invention, an auto-focusing system for automatically determining an in-focus position of a plurality of fields in at least a portion of a well in a plate, the plate having a plate bottom surface and each of the plurality of wells having a well bottom surface, the system including:

a computation component programmed to identify, for each field in a selected subset of the plurality of fields, a first position of the plate bottom surface with respect to the field and a second position of the well bottom surface with respect to the field;

a first scanning device functionally associated with the computation component, and including a first objective lens having a first magnification, signals obtained from the first objective lens being used by the computation component for identifying the positions of the plate bottom surface and of the well bottom surface with respect to each the field in the subset;

a storage component functionally associated with the computation component and with the first scanning device, configured to store alignment data relating to alignment of the plate along X and Y axes in the first scanning device during obtaining of the signals and data relating to the identified position of the plate bottom surface and of the well bottom surface for each the field in the subset; and a second scanning device functionally associated with the storage component and including at least one objective lens having a second magnification, the second magnification being not greater than the first magnification, the at least one objective lens configured for scanning each the field in the subset at the position of the well bottom surface, wherein the second scanning device is configured to align the plate along X and Y axes in the second scanning device based on the alignment data stored in the storage component.

In some embodiments, the second scanning device is further configured to align the at least one objective lens at a height along the Z axis of the second scanning device which is in focus with respect to the identified position of the well bottom surface.

In some embodiments, the first scanning device and the second scanning device are the same scanning device, and the scanning device is configured to align the plate along the X and Y axes following removal of the plate from the scanning device and reinsertion of the plate into the scanning device.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or monitors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIGS. 1A and 1B are, respectively, a top plan view of a multiwell plate and a sectional view of a single well in a multiwell plate, the well having a non-planar bottom surface, for which embodiments of the teachings herein may be useful;

FIGS. 5A and 5B are flow charts of two embodiments of a method for auto-focusing a scanning device of a scanning system on samples in a multiwell plate in accordance with embodiments of the teachings herein.

DESCRIPTION OF SOME EMBODIMENTS OF THE INVENTION

Figure 2:
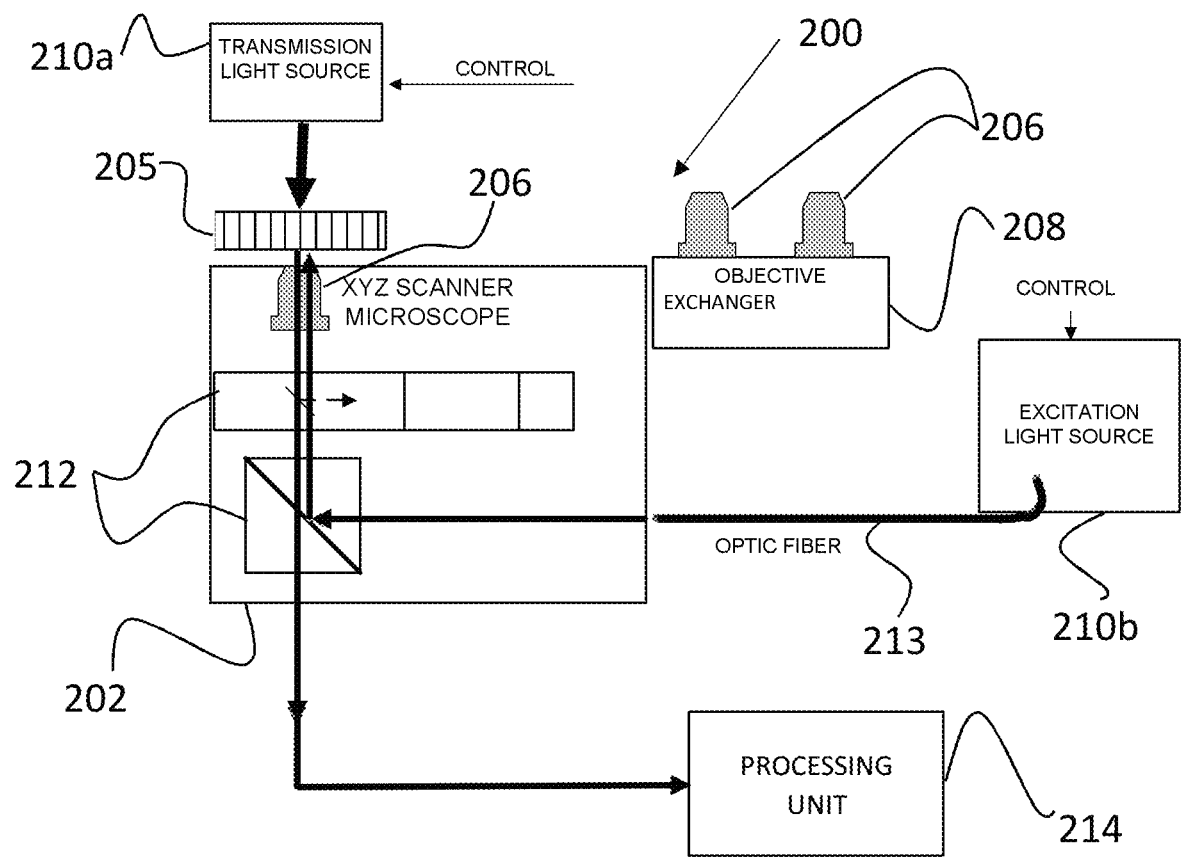
FIG. 2 is a block diagram of an embodiment of a scanning device for auto-focusing on samples in a multiwell plate in accordance with an embodiment of the teachings herein.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Reference is now made to FIGS. 1A and 1B which are, respectively, a top plan view of a multiwell plate and a sectional view of a single well in a multiwell plate, the well having a non-planar bottom surface, for which embodiments of the teachings herein may be useful.

As seen in FIG. 1A, a multiwell plate 10 has a top surface 11, side surfaces (not shown) and, in some embodiments, a bottom surface (not shown). The plate 10 includes a plurality of wells 12, arranged in a grid formed of columns 14 and rows 16 and accessible via apertures 17 in top surface 11. Typically, the rows and columns are enumerated or otherwise labeled so as to enable a user to easily reference a specific well 12. The multiwell plate 10 in the illustrated embodiment includes 96 wells, though other types of plates, which include, for example, a different number of wells, such as 12, 24, or 384 wells, may be used with the teachings herein as described in further detail hereinbelow. Typically, the wells 12 have fixed distances between one another, and thus are distributed on plate 10 at regular intervals. Specifications as to the distanced between wells are standard in the art, and are typically also provided by the manufacturer of the plate. Often, the number of wells in the plate have a 3:2 aspect ratio. As such the wells may be arranged, for example, as a 3×2 grid, 6×4 grid, 12×8 grid, or 24×16 grid.

Turning to FIG. 1 it is seen that the cross section of each well 12 in the plate 10 may be non-rectangular, such that the well has a non-linear bottom surface. In the illustrated embodiment, the well 12 includes a cavity 18 and has a U-shaped cross section, such that side walls 20 of the well generally form a cylinder, and a bottom portion 22 of the well forms part of a sphere, part of a paraboloid, or part of an ellipsoid, thereby defining a curved bottom surface to the well. As such, the well typically has a U-shaped cross-section or a cross-section somewhat resembling a parabola. Typically, the thickness of side walls 20 and of bottom portion 22 is uniform. A rim 26, typically forming part of, and being flush with or being raised with respect to, top surface 11 of plate 10, often surrounds the well 12.

Multiwell plates including wells having non-planar bottom surfaces are well known in the art, and are commercially available from many manufacturers, such as Corning Incorporated Life Sciences of Tewksbury, Mass. Such multi-well plates are used for many types of samples, including for growing spheroids, for growing non-adherent cells such as lymphocytes and other blood cells, for analysis of 3-dimensional samples and for handling of compounds. Oftentimes, analysis of such samples requires imaging of the samples within the wells.

It will be appreciated that due to the curvature of the bottom surface of well 12 the area at which a microscope viewing the well would be in focus is typically very small, and in some cases comprises a single point. As such, existing auto-focusing mechanisms, such as that disclosed in U.S. Pat. No. 7,109,459 often do not succeed in focusing on a sample disposed within the well. As explained hereinbelow, the method of the teachings herein enables an operator to autofocus a scanning device on a well having a non-planar bottom, such as U-shaped wells 12 of FIG. 1B, without having to manually focus the scanning device on each individual well.

It will be appreciated that though the exemplary illustration shows wells having a U-shaped cross section, the method of the teachings herein as described hereinbelow may be used for other types of wells, such as wells having a planar bottom surface and a rectangular cross section, or wells of a frusto-conical shape, i.e. comprising a cutoff cone having inclined side walls and a planar bottom, and having a generally trapezoidal cross section.

Reference is now made to FIG. 2, which is a block diagram of an embodiment of a scanning device 200 for auto-focusing on wells in a multiwell plate in accordance with an embodiment of the teachings herein.

It will be appreciated that the disclosure herein discusses auto-focusing on wells including samples as an example only, and that the same method and device may also be used to auto-focus on wells not containing a sample, or on a multiwell plate in which some wells include a sample and other wells do not.

As seen in FIG. 2, scanning device 100 includes a scanning microscope 202, functionally associated with a sample platform movable along the X, Y, and Z axes. The sample platform is configured to have disposed thereon a sample plate 205, which may be for example a plate like plate 10 of FIGS. 1A and 1B.

Microscope 202 further includes a plurality of objective lenses 206 functionally associated with an objective lens exchanger 208. At any given time, a single one of lenses 206 is aligned with a sample platform (not shown) and is operational, such that the sample plate disposed on the sample platform may be viewed through the objective lens. Objective lens exchanger 208 is configured to change the operational lens, used for viewing the sample, when a change of objective is required. An example of such an exchanger is described, for example, in WO 2012/097191, the contents of which are incorporated herein by reference.

Microscope 202 is functionally associated with at least one illumination source, controlled by a controlling unit (not shown). In some embodiments, the microscope includes a first illumination source comprising a transmission light source 210a, such as an LED lamp, configured to illuminate the sample platform during capturing signals from a sample plate 205 disposed thereon.

In some embodiments, the microscope further includes a second illumination source comprising an excitation light source 2101) configured to provide illumination to yield a response in a sample carried on or in the sample plate 205, such as providing illumination to excite a fluorescent or a luminescent component of the sample. In some embodiments, illumination from light source(s) 210a and/or 210b impinges upon one or more optical elements 212, such as a mirror, a dichroic cube, a beam splitter, a filter, and the like, prior to impinging upon a sample disposed on the sample plate 205. In some embodiments, illumination from illumination source(s) 210 travels through an optic fiber 213 before impinging on the sample.

In the context of the present application, the term "signals" relates to any illumination signals which may be obtained from the sample plate, including, but not limited to, laser reflection signals, laser refraction signals, and images obtained by an imaging mechanism of a scanning device as described.

In some embodiments, the image visible by microscope 202 is captured by an image capturing unit (not shown), and is transferred to a processing unit 214 for further processing and analysis.

Figure 3:
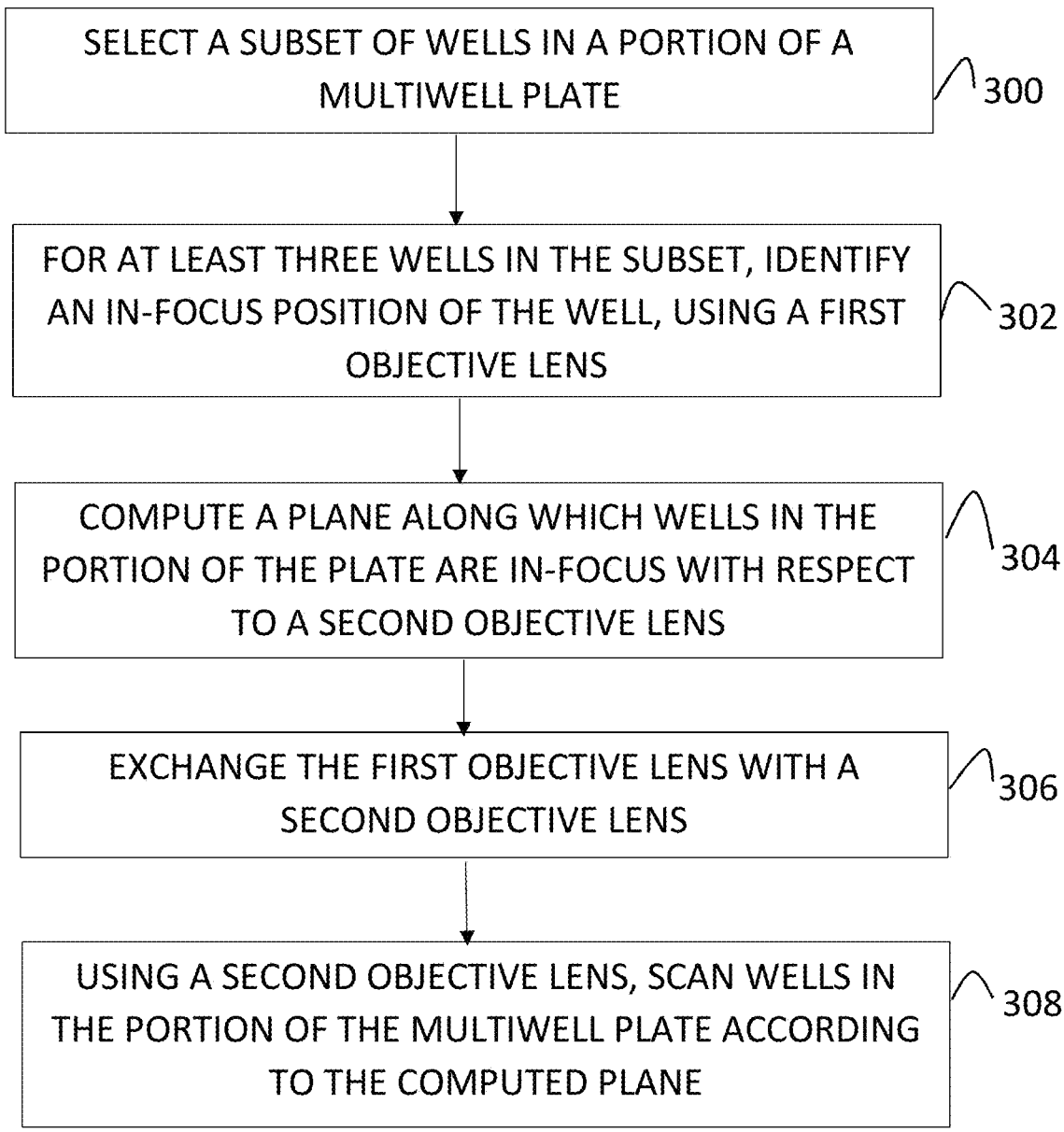
FIG. 3 is a flow chart of an embodiment of a method for auto-focusing a scanning device on samples in a multiwell plate in accordance with an embodiment of the teachings herein.

Reference is now made to FIG. 3, which is a flow chart of an embodiment of a method for auto-focusing a scanning device on samples in a multiwell plate in accordance with an embodiment of the teachings herein.

The method described hereinbelow may be used in a scanning device, such as scanning device 200 of FIG. 2, to automatically determine an in-focus position of a plurality of samples disposed in a sample plate, such as plate 10 of FIG. 1A, the plate containing a plurality of wells. The method may be carried out on a plate including wells having a non-planar bottom surface, such as wells 12 of FIG. 1B, or on other types of wells, such as wells having a planar bottom surface, or frusto-conical wells having inclined side walls and a planar bottom, and the like.

As seen at step 300, a subset of the wells in the plate is selected. In some embodiments, the subset includes at least three wells that each contains a liquid or a sample, though this is not necessary for the method disclosed herein. For at least three of the wells in the subset, and in some embodiments for all the wells in the subset, an in-focus position of the sample included in the well is identified with respect to a first objective lens having a first magnification, such as an objective lens 206 of FIG. 2, at step 302.

Typically, the first objective lens has a fairly large magnification, such as for example 20×, 10× or the like.

In some embodiments, the subset includes more than three wells, but in-focus positions are identified only for three of the wells in the subset. In some embodiments, the subset includes more than three wells, and in-focus positions are identified for more than three wells in the subset, but not for all the wells in the subset. For example, the subset may contain at least five wells, and in-focus positions are identified for at least four wells but not for all the wells in the subset. In some embodiments, in-focus positions are identified for all the wells in the subset.

The in-focus positions of the samples in the wells of the subset may be identified using any suitable method known in the art, including both manual and automatic methods. In some embodiments, the in-focus positions are identified substantially as described in U.S. Pat. No. 7,109,459, which is incorporated by reference as if fully set forth herein.

In accordance with the teachings of U.S. Pat. No. 7,109,459, in order to identify the in-focus positions, the focal plane of the first objective is spaced from a surface of the plate, such as a bottom surface of the plate, a certain distance, for example about one millimeter. The focal plane of the objective is then displaced towards the plate, for example by displacing the objective or the plate relative to one another. For example, the objective lens may be disposed below the plate, such that the focal plane of the objective lens is disposed below the surface of the plate and the focal plane is displaced vertically upward toward the surface of the plate.

During displacement of the focal plane of the objective lens, control hardware of the microscope records the intensity of light reflected from the plate, until the intensity of the detected light reaches a maximal value, which, in some embodiments, is higher than a preset threshold. This maximal value of the detected light intensity corresponds to an in-focus position of a surface of the plate.

Without wishing to be bound by theory, in the example described above, in which the objective lens is disposed below the plate and the focal plane is initially disposed below the plate and is displaced toward the plate, it is believed that the location at which maximal light intensity is observed corresponds to a point at which the focal plane of the objective lens is tangential to the curved surface of the well bottom.

Subsequently, in some embodiments, the focal plane of the objective continues to be displaced toward the plate, until another peak in the intensity of reflected light is detected, the peak being defined by a respective threshold value in accordance with the environment and the sample being tested. Without wishing to be bound by theory, in the example described above, in which the objective lens is disposed below the plate and the focal plane is initially disposed below the plate and is displaced toward the plate, it is surmised that this second peak in the intensity of the reflected light occurs when the focal plane of the objective lens is tangent to the intra-well plate bottom, and typically represents an offset from an in-focus position of the sample. The magnitude of the offset may be determined manually by the user, or may be determined automatically using methods known in the art.

In some embodiments, the offset is computed from the first peak in the intensity of detected light, without continuing the search for a second peak in the intensity of detected light. In such embodiments, the magnitude of the offset may be determined manually by the user, or may be determined automatically using methods known in the art.

It will be appreciated that the direction in which the focal plane is displaced toward the plate, and the order in which the peaks in intensity of detected light are identified, is dependent on the setup of the scanning device. For example, in some embodiments, the objective lens is disposed below the sample plate, but the focal plane of the objective lens is disposed above the well bottom, such that the focal plane would be displaced downward toward the well bottom.

Without wishing to be bound by theory, in such embodiments, it is surmised that the first peak in the intensity of the reflected light occurs when the focal plane of the objective lens is tangent to the intra-well plate bottom, and typically represents an offset from an in-focus position of the sample while the location at which the second peak in intensity of the reflected light is detected corresponds to a point at which the focal plane of the objective lens is tangential to the curved surface of the well bottom. A corresponding situation occurs in other embodiments in which the objective lens is disposed above the sample plate, and the focal plane of the objective lens is disposed above the well bottom, such that the focal plane would be displaced downward toward the well bottom.

As another example, in some embodiments, the objective lens is disposed above the sample plate, but the focal plane of the objective lens is disposed below the well bottom, such that the focal plane would be displaced upward toward the well bottom. Without wishing to be bound by theory, in such embodiments, it is surmised that the location at which the first peak in intensity of the reflected light is detected corresponds to a point at which the focal plane of the objective lens is tangential to the curved surface of the well bottom while the second peak in the intensity of the reflected light occurs when the focal plane of the objective lens is tangent to the intra-well plate bottom, and typically represents an offset from an in-focus position of the sample.

In some embodiments, the center of the well, at which the in-focus position would lie, is identified based on the plate specifications provided by the manufacturer. In some embodiments, the center of the well is determined using X-Y displacement of the plate or X-Y displacement of the objective lens, until the center of a well or the edge of a well are identified using suitable light detection parameters and characteristics, as is known in the art.

At step 304, at least three of the in-focus positions identified at step 302 are used to compute a plane along which at least some of the plurality of wells in the plate, and typically all the wells in the plate, are in-focus or close to in-focus with respect to a second objective lens, such as an objective lens 206 of FIG. 2. The second objective lens has a second magnification which is not greater than the first magnification of the first objective lens. As described hereinbelow, the wells are scanned using the second objective lens based on the location computed plane, by maintaining the position of the second objective lens during scanning so that for any given well scanned, the calculated plane and the focal plane of the second objective lens are coincident or close to coincident.

In some embodiments, the plane is computed by translating at least three of, and typically each of, the in-focus positions identified in step 302 using the first objective lens to corresponding second in-focus positions with respect to the second objective lens, based on optical characteristics of the second objective lens, and computing a plane including at least three of the second in-focus positions.

In some embodiments, the plane is computed by computing, on the basis of at least three of the in-focus positions, a first plane along which at least some of the plurality of wells in the plate, and typically all the wells in the plate, are in-focus or close to in-focus with respect to the first objective lens. The first plane is then translated into the corresponding plane along which at least some of the wells, and typically all the wells, are in-focus or close to in-focus with respect to the second objective lens, based on optical characteristics of the second objective lens.

As mentioned above, the second objective lens has a magnification that is not greater than the first magnification of the first objective lens. As such, in some embodiments the second magnification is smaller than the first magnification, and may be, for example, 4× or 2×. In some embodiments, the second magnification is equal to the first magnification, but the numerical aperture value of the second objective lens is higher than the numerical aperture value of the first objective lens.

In some embodiments, the plane is computed using all the in-focus positions identified at step 302. In other embodiments, the plane is computed using fewer than all the in-focus positions identified at step 302.

In some embodiments, the plane is computed for a section of the plate, for example for a quadrant, using at least three in-focus positions identified, using the first objective lens, within that section of the plate. In such embodiments, the method described herein is repeated for each section or quadrant of the plate using a different set of in-focus positions for each such section.

At step 306, which may occur before or after step 304 above, the first objective lens is changed to the second objective lens, for example by a suitable hardware mechanism such as objective lens exchanger 208 of FIG. 2. In some embodiments the first and second objective lenses are identical, and step 306 of FIG. 3 is omitted.

Finally, at step 308, the wells of the multiwell plate are scanned, or imaged, along the plane computed at step 304, using the second objective lens, without carrying out any additional focusing operations.

The scanning at step 308 may be carried out using any suitable method known in the art, including capturing an image stack, which is particularly useful when imaging a three dimensional construct such as a spheroid.

In some embodiments, the teachings herein may be carried out on a plate having a single well, or on a single well within a multi-well plate. In such embodiments, the first objective is used to find an in-focus point of the sample in the plate. The in-focus point found using the first objective is translated into an in-focus point for the second objective, based on the optical characteristics of the second objective. The second objective is then used to scan the plate, when placed at the translated in-focus point, or at the height thereof.

As mentioned hereinabove, in some embodiments, it is advantageous to initially perform pre-scanning, or mapping, of the topography of a multi-well or other plate prior to conducting the scanning described herein. For example, when using a sophisticated scanning machine, such pre-scanning may be carried out in a simpler machine and reduce the time the scanning machine spends on focusing operations, thereby increasing its productivity.

As another example, in some cases, it is desirable to carry out the actual scanning using an oil immersion objective lens or a water immersion objective lens, so as to be able to use a higher numerical aperture during the scanning and to reduce refraction between the lens and the liquid medium of a sample. As is well known in the art, an oil immersion objective lens is an objective lens, which has been designed for use with oil, rather than air, as the medium between the lens of the objective and the surface of the imaged sample. Similarly, a water immersion objective lens is an objective lens which has been designed for use with water, rather than air, as the medium between the lens of the objective and the surface of the imaged sample. Consequently, in contrast to a standard objective lens which is used with air between the lens of the objective and the imaged sample, an oil immersion objective lens or a water immersion objective lens will have high power and a short focal length, and will not be suitable for use as an objective in the absence of oil or water having the refractive index with which the objective was designed to work.

As mentioned above, oil immersion lenses and water immersion lenses are less suitable for prior art autofocusing methodologies. This is due to the fact that the similar refraction index between the lens and the liquid medium of the sample causes there to be no focusing peak at the well bottom surface (the transition between the plastic of the plate and the liquid of the sample). In such cases, it is helpful to carry out initial auto-focusing onto the plate bottom surface, using an air objective lens. The plate may then be transferred to a device including the oil immersion lens, and focusing the oil immersion lens in a step-by-step fashion from the position of the plate bottom surface identified in the initial mapping.

Figure 4:
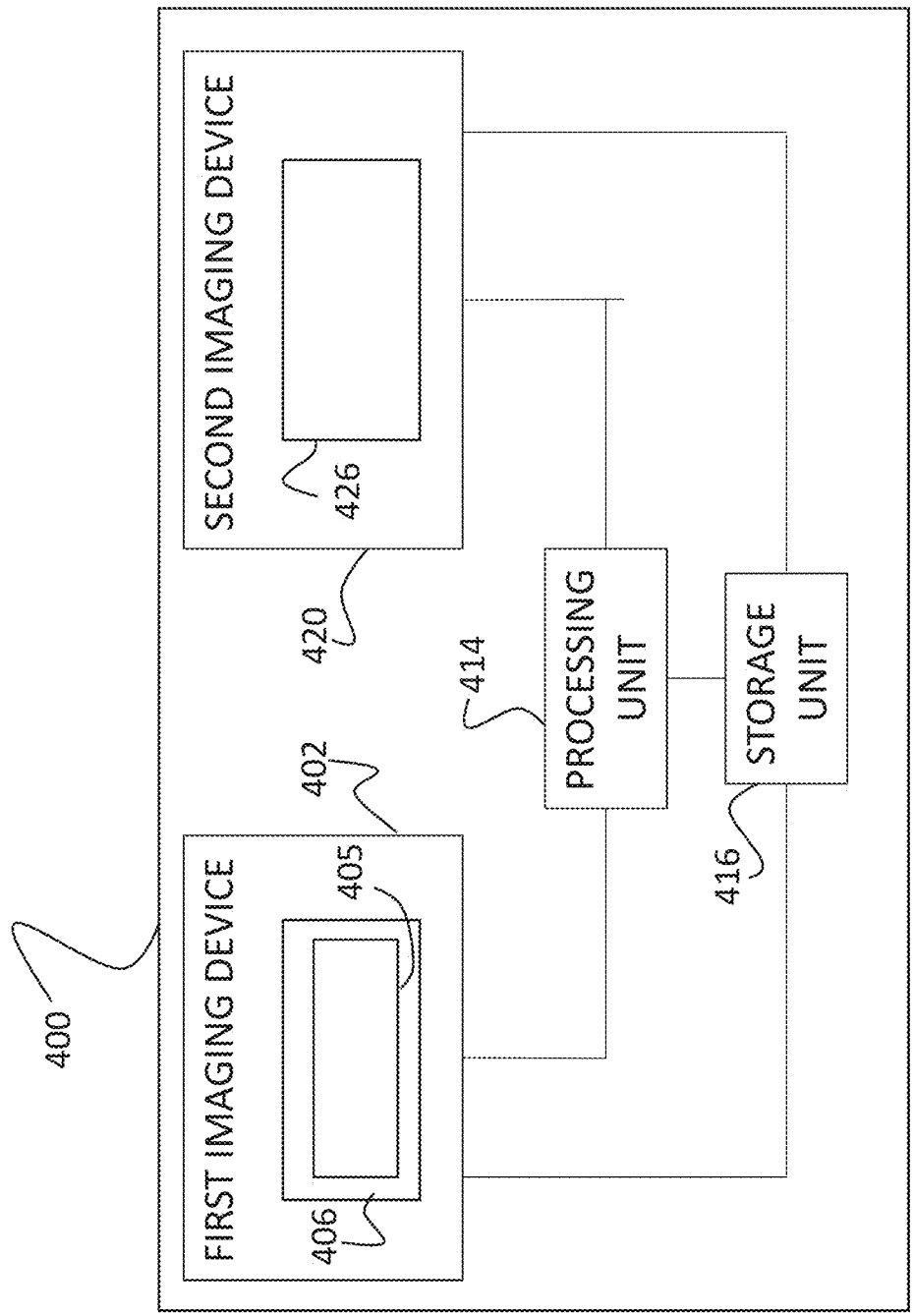
FIG. 4 is a block diagram of an embodiment of a scanning system for auto-focusing on samples in a multiwell plate in accordance with another embodiment of the teachings herein.

Reference is now made to FIG. 4, which is a block diagram of an embodiment of an scanning system 400 for auto-focusing on wells in a multiwell plate in accordance with an embodiment of the teachings herein.

As seen in FIG. 4, the system includes a first scanning device 402, similar to device 200 described hereinabove with respect to FIG. 2. As described hereinabove, the first scanning device 402 may include a scanning microscope and may be functionally associated with a sample platform movable along the X, Y, and Z axes. The sample platform is configured to have disposed thereon a sample plate 405, held in a predetermined three dimensional position by at least one dedicated plate holder 406.

As described hereinabove, the microscope includes at least one objective lens, and in some cases a plurality of objective lenses functionally associated with an objective lens exchanger, such as that shown in U.S. Pat. No. 9,170,412, the contents of which are incorporated herein by reference. The microscope is functionally associated with at least one illumination source, controlled by a controlling unit (not shown). In some embodiments, the microscope includes a first (single) illumination source configured to illuminate the sample on the sample platform during imaging of the sample plate; in some embodiments the microscope includes a first illumination source configured to illuminate the sample on the sample platform during focusing and imaging of the sample plate and further includes a second illumination source comprising an excitation light source configured to provide illumination to yield a response in a sample carried on or in the sample plate, such as providing illumination to excite a fluorescent or a luminescent component of the sample.

In some embodiments, illumination from the light source(s) impinges upon one or more optical elements, such as a mirror, a dichroic cube, a beam splitter, a filter, and the like, prior to impinging upon a sample disposed on the sample plate. In some embodiments, illumination from illumination source(s) travels through an optic fiber before impinging on the sample, all as described hereinabove.

In some embodiments, the illumination signals captured by the microscope of device 402 are transferred to a processing unit 414 for further processing and analysis. Processing unit 414 is configured to identify, based on the signals obtained from first scanning device 402, a position of a plate bottom surface and/or a well bottom surface in at least one well or field of a well of the sample plate 405. In some embodiments, the illumination signals may be laser reflection signals or laser refraction signals, whereas in other embodiments, in which the device 402 includes an image capturing unit (not shown), the illumination signals may be images captured by the image capturing unit.

In some embodiments, the system 400 further includes a storage unit, such as a computer storage element 416, in communication with the first scanning device 402 and with processing unit 414. The storage element 416 is configured to store the position of the plate bottom surface and/or of the well bottom surface along the Z axis, or a distance between the objective lens and the plate bottom surface/well bottom surface, as identified by processing unit 414, as well as the coordinates of the sample plate within first scanning device 402 along the X and Y axes.

In some embodiments, system 400 further includes a second scanning device 420, functionally associated with storage unit 416 and with processing unit 414, the second scanning device 420 being substantially similar to device 200 described hereinabove with respect to FIG. 2, and including similar components.

Specifically, second scanning device 420 includes at least one plate holder 426 similar to the plate holder(s) of first scanning device 402. When the plate is held by plate holder(s) 426 in second scanning device 420, the information stored in the storage element 416 may be used to align the plate along the X and Y axes so that the plate in the second scanning device 420 is in the same position as it was during pre-scanning in first scanning device 402. Additionally, the information stored in storage element 416 may be used to align the objective lens of scanning device 426 at a position along the Z axis which corresponds to, or is based on, the Z position of the plate bottom surface or well bottom surface as determined by the first scanning device.

Signals, including images captured by second scanning device 420 are transmitted to processing unit 414 for processing thereof.

In some embodiments, first and second scanning devices 402 and 420 share a single processing unit 414, as illustrated in FIG. 4. In some such embodiments, the single processing unit 414 may be a component of a third device of the system 400, separate from the first and second scanning devices, as shown in FIG. 4. In other embodiments, the single processing unit may form part of the first scanning device 402 and be in communication with second scanning device 420, or may form part of the second scanning device 420 and be in communication with first scanning device 402.

In other embodiments, each of the first and second scanning devices may be associated with a dedicated processing unit forming part of the scanning device.

Figure 5A:
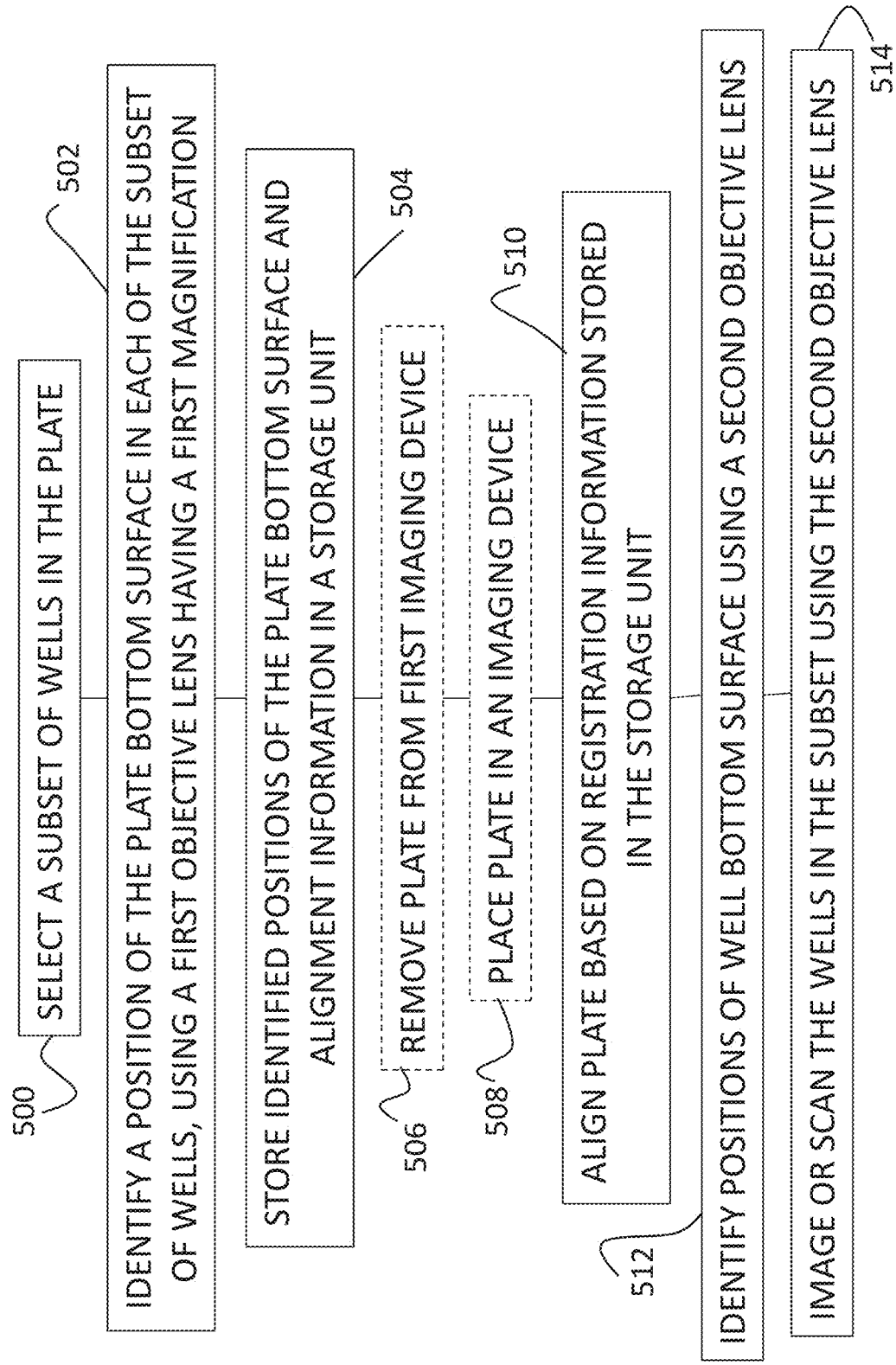

Reference is now made to FIGS. 5A and 5B, which are flow charts of two embodiments of a method for auto-focusing a scanning device of a scanning system on samples in a multiwell plate in accordance with embodiments of the teachings herein.

The methods described hereinbelow may be carried out in a scanning system, such as scanning system 400 of FIG. 4, to automatically determine an in-focus position of a plurality of samples disposed in a sample plate containing a plurality of wells.

Referring specifically to FIG. 5A, as seen at step 500, a subset of the wells in the plate is selected. In some embodiments, the subset includes at least one well that contains a liquid or a sample, though this is not necessary for the method disclosed herein. For at least some wells in the subset, and in some embodiments for all the wells in the subset, a position of the plate bottom surface is identified with respect to a first objective lens having a first magnification, such as the objective lens of first scanning device 402 of FIG. 4, at step 502.

In the context of the present application, the plate bottom surface is defined as the lower surface of the plate bottom, which interfaces with the environment surrounding the plate, such that at the plate bottom surface the illumination beam (laser beam) transfers from the air surrounding the plate to the glass or plastic of the plate.

Typically, the first objective lens has a first magnification, such as for example 10×, 20× or the like.

The position of the plate bottom surface in the wells of the subset may be identified using any suitable method known in the art, including both manual and automatic methods. In some embodiments, the positions of the plate bottom surface are identified substantially as described in U.S. Pat. No. 7,109,459, which is incorporated by reference as if fully set forth herein, substantially as described hereinabove.

At step 504, the identified positions of the plate bottom surfaces at the wells in the subset are stored in a storage unit, such as storage unit 416 of FIG. 4, together with information relating to the alignment of the sample plate along X and Y axes within the first scanning device. For example, the alignment information may include information relating to the X-Y position of the first objective lens relative to the plate or to each well thereof, as well as the distance between the first objective lens and the sample plate or a marked area thereof, or the Z position of the first objective lens relative to the plate or to each well thereof, during scanning of the plate using the first objective lens. The plate may then optionally be removed from the first scanning device at step 506.

At some later time, at step 508 the plate is placed in its dedicated location in a second scanning device forming part of the scanning system, for example second scanning device 420 of FIG. 4. However, in some embodiments, the second scanning device may be the same as the first scanning device, and the plate may be reinserted into the first scanning device after being removed therefrom.

The second scanning device includes a second objective lens. At step 510 the plate is aligned in the second scanning device so as to be aligned, along the X and Y axes in the second scanning device, in a position corresponding to that used in the first scanning device, based on the alignment data stored in the storage element 416.

At step 512, using the scanning device and the second objective lens and beginning at the position along the Z axis of the plate bottom surface as identified in step 502, the second scanning device scans the wells in the subset to identify the well bottom surface of each such well.

The second objective lens has a magnification that is not greater than the magnification of the first objective lens. As such, in some embodiments the second magnification is smaller than the first magnification. In some embodiments, the second magnification may be for example, 2× or 4×. In some embodiments, the second magnification is equal to the first magnification, but the numerical aperture value of the second objective lens is higher than the numerical aperture value of the first objective lens. In some embodiments, the ratio between the first magnification and the second magnification is in the range of 1-10, 1-5, 1-3, or 1-2.

Based on the identified position of the well bottom surface, the wells in the subset are scanned or imaged at step 514, using the second objective lens.

The scanning at step 514 may be carried out using any suitable method known in the art, including capturing an image stack, which is particularly useful when imaging a three dimensional construct such as a spheroid.

In some embodiments, the second objective lens and the first objective lens form part of a single device, so that a single imaging device is used as the first and the second imaging device. In such embodiments, the plate may be removed from the device and then may be returned to the same device for identification of the well bottom surface. Alternately the steps of removing the plate from the device (step 506), placing the plate in the second device (step 508), and aligning the plate in the second device (step 510), may be obviated altogether.

In some embodiments, the second objective lens is an oil immersion objective lens or a water immersion objective lens.

In some embodiments, the teachings herein may be carried out on a plate having a single well, for example with respect to in multiple fields of the single well, or on a single well within a multi-well plate.

Turning now to FIG. 5B, where like steps are labeled by like reference numerals, as seen at step 500, a subset of the wells in the plate is selected, substantially as described hereinabove with respect to FIG. 5A. For at least some wells in the subset, and in some embodiments for all the wells in the subset, a position of the plate bottom surface as well as a position of the well bottom surface is identified with respect to a first objective lens having a first magnification, such as the objective lens of first scanning device 402 of FIG. 4, at step 502b.

As discussed hereinabove, typically, the first objective lens has a first magnification, such as for example 10×, 20×, 40× or the like.

The positions of the plate bottom surface and the well bottom surface in the wells of the subset may be identified using any suitable method known in the art, including both manual and automatic methods. In some embodiments, the positions of the plate bottom surface are identified substantially as described in U.S. Pat. No. 7,109,459, which is incorporated by reference as if fully set forth herein, substantially as described hereinabove.

At step 504b, the identified positions of the plate bottom surfaces and well bottom surfaces at the wells in the subset are stored in a storage unit, such as storage unit 416 of FIG. 4, together with information relating to the alignment of the sample plate along X and Y axes within the first scanning device, substantially as describe hereinabove. The plate may then optionally be removed from the first scanning device at step 506.

At some later time, at step 508 the plate is placed in its dedicated location in a second scanning device forming part of the imaging system, for example second scanning device 420 of FIG. 4. However, in some embodiments, the second scanning device may be the same as the first scanning device, and the plate may be reinserted into the first scanning device after being removed therefrom.

The second scanning device includes a second objective lens. At step 510 the plate is aligned in the second scanning device so as to be aligned, along X, Y, and Z axes in the second scanning device, in a position corresponding to that used in the first scanning device, based on the alignment data stored in the storage element 416.

At step 512b, based on the position of the well bottom surface identified in step 502b, the wells in the subset are scanned or imaged using the second objective lens.

The scanning at step 512b may be carried out using any suitable method known in the art, including capturing an image stack, which is particularly useful when imaging a three dimensional construct such as a spheroid.

As discussed hereinabove, the second objective lens has a magnification that is not greater than the magnification of the first objective lens. As such, in some embodiments the second magnification is smaller than the first magnification. In some embodiments, the second magnification may be for example, 2× or 4×. In some embodiments, the second magnification is equal to the first magnification, but the numerical aperture value of the second objective lens is higher than the numerical aperture value of the first objective lens. In some embodiments, the ratio between the first magnification and the second magnification is in the range of 1-10, 1-5, 1-3, or 1-2.

In some embodiments, at step 516, prior to the scanning step 512b, a corresponding in-focus position for the well bottom surface with respect to the second objective lens is computed based on the information stored at step 504. In some embodiments, the computation of the corresponding in-focus position is based also on the difference in magnification and/or in numerical aperture between the first and second objective lenses. In some embodiments, the second objective lens is an oil immersion objective lens or a water immersion objective lens, and the computation of a corresponding in-focus position is based (also) on the differences in optical characteristics between a standard (air) objective lens and an oil immersion objective lens or water immersion objective lens.

In some embodiments, the second objective lens and the first objective lens form part of a single device, so that a single scanning device is used as the first and the second scanning device. In such embodiments, the plate may be removed from the device and then may be returned to the same device for identification of the well bottom surface. Alternately the steps of removing the plate from the device (step 506), placing the plate in the second device (step 508), and aligning the plate in the second device (step 510), may be obviated altogether.

In some embodiments, the teachings herein may be carried out on a plate having a single well, for example with respect to in multiple fields of the single well, or on a single well within a multi-well plate.

It will be appreciated that the teachings herein allow the scanning device to be in-focus with respect to the plate regardless of the "expected height difference" and of the "unexpected height difference" within the plate. The "expected height difference" is defined as the curvature of the plate listed in the specifications of the plate and that is intended by the manufacturer to be in the plate, such as having a curved bottom due to the structure. The "unexpected height difference" is defined as lack of planarity which is not intended in the specification of the plate. Such "unexpected height difference" may be, for example, due to differences in the relative heights of the bottoms of the wells; or may be, for example, due to deviations from planarity in the virtual surface traced by the scanning components as the objective is moved; or the surface upon which the plate rests being non-parallel with the virtual surface traced by the scanning components as the objective is moved.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting,

The invention claimed is:

1. A method for scanning a plurality of wells in at least a portion of a multi-well plate, the multi-well plate having a plate bottom surface and each said well in said plurality of wells having a well bottom surface, the method comprising:
    using a first objective lens having a first magnification to identify, for each well in a selected subset of said plurality of wells, a first position of said plate bottom surface and a second position of a well bottom surface with respect to said well;
    based on said identified second position, identifying, for each said well in said selected subset, an in-focus position of said well relative to at least one objective lens having a second magnification that is not greater than said first magnification; and
    using said at least one objective lens to scan each of said wells in said selected subset at said in-focus position of said well.

2. The method of claim 1, wherein said using a first objective lens is carried out in a first scanning device and said using said at least one objective lens is carried out in a second scanning device, and wherein the method further comprises, following said using said first objective lens and prior to said using said at least one objective lens:
    storing alignment data relating to alignment of said plate along X and Y axes in said first scanning device, and data relating to said identified position of said well bottom surface, in a computer storage element which is in communication with said first and said second scanning devices;
    moving said multi-well plate to said second scanning device; and
    aligning said multi-well plate along X and Y axes in said second scanning device based on said alignment data stored in said computer storage element.

3. The method of claim 2, wherein said aligning further comprises aligning said at least one objective lens of said second scanning device at a height along a Z axis which is orthogonal to said X and Y axes of said second scanning device which is in focus with respect to said identified position of said well bottom surface.

4. The method of claim 2 wherein said first scanning device and said second scanning device are the same scanning device, the method further comprising, following said storing said alignment data, removing said multi-well plate from said first scanning device, and wherein said moving said multi-well plate to said second scanning device comprises returning said multi-well plate to said first scanning device.

5. The method of claim 2 wherein said first scanning device and said second scanning device are the same scanning device, the method further comprising, following said storing said alignment data, changing an objective lens of said scanning device from said first objective lens to said at least one objective lens.

6. The method of claim 1, wherein said first objective lens comprises an air objective lens, wherein said at least one objective lens is a second objective lens which is an oil immersion objective lens or a water immersion objective lens, and wherein said identifying comprises computing a difference between said second position and said in-focus position due to said first objective lens and said second objective lens being of different types.

7. The method of claim 1, wherein said at least one objective lens is a second objective lens, different from said first objective lens, and wherein said second magnification is smaller than said first magnification, and wherein said identifying comprises computing a difference between said second position and said in-focus position due to a magnification difference between said first and second magnifications.

8. The method of claim 1, wherein said at least one objective lens is said first objective lens and said first magnification is equal to said second magnification.

9. The method of claim 1, wherein said at least one objective lens is a second objective lens, different from said first objective lens, wherein said second magnification is smaller than said first magnification.

10. The method of claim 1, wherein each of said wells comprises a generally cylindrical side wall, and a bottom surface comprising a portion of at least one of a sphere, a paraboloid, and an ellipsoid.

11. The method of claim 1, wherein each of said wells is frusto-conical.

12. An auto-focusing device for automatically determining an in-focus position of a plurality of wells located in at least a portion of a plate containing wells, the plate having a plate bottom surface and each of said plurality of wells having a well bottom surface, the device comprising:
  a computation component programmed to identify a position of the plate bottom surface with respect to each well in a selected subset of said plurality of wells and a position of the well bottom surface with respect to each said well in said selected subset;
  a first objective lens functionally associated with said computation component, said first objective lens having a first magnification, signals obtained with said first objective lens being used by said computation component for identifying said position of said plate bottom surface with respect to each said well in said subset; and
  at least one objective lens having a second magnification, said second magnification being not greater than said first magnification, signals obtained with said at least one objective lens being used by said computation component for identifying said position of said well bottom surface with respect to each said well in said subset, said at least one objective lens configured for scanning each said well in said subset at said position of said well bottom surface.

13. The auto-focusing device of claim 12, wherein said at least one objective lens is said first objective lens and said second magnification is equal to said first magnification.

14. The auto-focusing device of claim 12, wherein said at least one objective lens is a second objective lens, different from said first objective lens, and wherein said second magnification is smaller than said first magnification.

15. The auto-focusing device of claim 12, wherein said second objective lens is an oil immersion objective lens, and wherein said computation component is programmed to compute, based on at least one of said positions of said plate bottom surface and said well bottom surface identified with respect to said first objective lens, at least one of a corresponding position of said plate bottom surface and said well bottom surface with respect to said oil immersion objective lens.

16. The auto-focusing device of claim 12, wherein said second objective lens is a water immersion objective lens, and wherein said computation component is programmed to compute, based on at least one of said positions of said plate bottom surface and said well bottom surface identified with respect to said first objective lens, at least one of a corresponding position of said plate bottom surface and said well bottom surface with respect to said water immersion objective lens.

17. An auto-focusing device for automatically determining an in-focus position of a plurality of wells located in at least a portion of a plate containing wells, the plate having a plate bottom surface and each of said plurality of wells having a well bottom surface, the device comprising:
  a computation component programmed to identify a position of the plate bottom surface with respect to each well in a selected subset of said plurality of wells and a position of the well bottom surface with respect to each said well in said selected subset;
  a first objective lens functionally associated with said computation component, said first objective lens having a first magnification, signals obtained with said first objective lens being used by said computation component for identifying said positions of said plate bottom surface and of said well bottom surface with respect to each said well in said subset; and
  at least one objective lens having a second magnification, said second magnification being not greater than said first magnification, said at least one objective lens configured for scanning each said well in said subset at said position of said well bottom surface.

18. The auto-focusing device of claim 17, wherein said at least one objective lens is a second objective lens, different from said first objective lens, and wherein said second magnification is smaller than said first magnification.

19. The auto-focusing device of claim 17, wherein said second objective lens is an oil immersion objective lens, and wherein said computation component is programmed to compute, based on at least one of said positions of said plate bottom surface and said well bottom surface identified with respect to said first objective lens, at least one of a corresponding position of said plate bottom surface and said well bottom surface with respect to said oil immersion objective lens.

20. The auto-focusing device of claim 17, wherein said second objective lens is a water immersion objective lens, and wherein said computation component is programmed to compute, based on at least one of said positions of said plate bottom surface and said well bottom surface identified with respect to said first objective lens, at least one of a corresponding position of said plate bottom surface and said well bottom surface with respect to said water immersion objective lens.

* * * * *